US012580825B2

(12) United States Patent
Keshavamurthy et al.

(10) Patent No.: US 12,580,825 B2
(45) Date of Patent: Mar. 17, 2026

(54) APPARATUS, METHOD, AND COMPUTER PROGRAM

(71) Applicant: Nokia Technologies Oy, Espoo (FI)

(72) Inventors: Prajwal Keshavamurthy, Munich (DE); Tejas Subramanya, Munich (DE); Gerald Kunzmann, Munich (DE)

(73) Assignee: Nokia Technologies Oy, Espoo (FI)

(*) Notice: Subject to any disclaimer, the term of this patent is extended or adjusted under 35 U.S.C. 154(b) by 146 days.

(21) Appl. No.: 18/575,407

(22) PCT Filed: Jun. 30, 2021

(86) PCT No.: PCT/EP2021/068039
§ 371 (c)(1),
(2) Date: Dec. 29, 2023

(87) PCT Pub. No.: WO2023/274526
PCT Pub. Date: Jan. 5, 2023

(65) Prior Publication Data
US 2024/0333603 A1 Oct. 3, 2024

(51) Int. Cl.
*H04L 41/16* (2022.01)
*H04L 43/0882* (2022.01)
(52) U.S. Cl.
CPC .......... *H04L 41/16* (2013.01); *H04L 43/0882* (2013.01)

(58) Field of Classification Search
CPC ..... H04L 41/16; H04L 43/0882; H04L 41/12; H04L 43/08; H04L 41/0806; H04L 43/065; G06N 3/084; G06N 3/098; H04W 24/10
See application file for complete search history.

(56) References Cited

U.S. PATENT DOCUMENTS 10,425,294 B2 * 9/2019 Vasseur ................... G06N 5/01

FOREIGN PATENT DOCUMENTS

| WO | 2019/032037 A1 | 2/2019 |
| WO | 2022/028663 A1 | 2/2022 |
| WO | 2022/089751 A1 | 5/2022 |
| WO | 2022/171354 A1 | 8/2022 |
| WO | 2022/233511 A1 | 11/2022 |

OTHER PUBLICATIONS

Office action received for corresponding India Patent Application No. 202447001077, dated Jun. 16, 2025, 7 pages.
(Continued)

*Primary Examiner* — Philip C Lee
(74) *Attorney, Agent, or Firm* — Nokia Technologies Oy

(57) ABSTRACT
The disclosure relates to an apparatus comprising at least one processor and at least one memory including computer code for one or more programs, the at least one memory and the computer code configured, with the at least one processor, to cause the apparatus at least to: determine (700) whether at least one reporting criterion is met; and trigger (702) the provision of a report to a central node when the at least one reporting criterion is met, wherein the report comprises an indication that at least one reporting criterion is met and/or an indication of the at least one reporting criterion being met.

18 Claims, 9 Drawing Sheets

(56)                    References Cited

OTHER PUBLICATIONS

"New WID on Study on traffic characteristics and performance requirements for AI/ML model transfer in 5GS (from S1-193606)", 3GPP TSG SA Meeting #86, SP-191040, Agenda Item: 6.6, SA WG1, Dec. 10-13, 2019, 3 pages.

"Zero-touch network and Service Management (ZSM); Enablers for Artificial Intelligence-based Network and Service Automation", ETSI GS ZSM 012, V1.1.1, Dec. 2022, pp. 1-42.

Mcmahan et al., "Communication-efficient learning of deep networks from decentralized data", Proceedings of the 20th International Conference on Artificial Intelligence and Statistics, vol. 54, 2017, 10 pages.

Nishio et al., "Client selection for federated learning with heterogeneous resources in mobile edge", arXiv, Oct. 30, 2018, 7 pages.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

International Search Report and Written Opinion received for corresponding Patent Cooperation Treaty Application No. PCT/EP2021/068039, dated Mar. 21, 2022, 14 pages.

"3rd Generation Partnership Project; Technical Specification Group Services and System Aspects; Study on traffic characteristics and performance requirements for AI/ML model transfer in 5GS (Release 18)", 3GPP TR 22.874, V18.0.1, Jun. 2021, pp. 1-111.

"Clarification on Federated Learning among Multiple NWDAFs in TS 23.288", 3GPP TSG-WG SA2 Meeting #157, S2-2307884, China Mobile, May 22-26, 2023, 5 pages.

"Updates for Nnwdaf_MLModelTraining service", 3GPP TSG-WG SA2 Meeting #157, S2-2307882, Vivo, May 22-26, 2023, 8 pages.

"3rd Generation Partnership Project; Technical Specification Group Services and System Aspects; Architecture enhancements for 5G System (5GS) to support network data analytics services (Release 18)", 3GPP TS 23.288, V18.3.0, Sep. 2023, pp. 1-316.

* cited by examiner

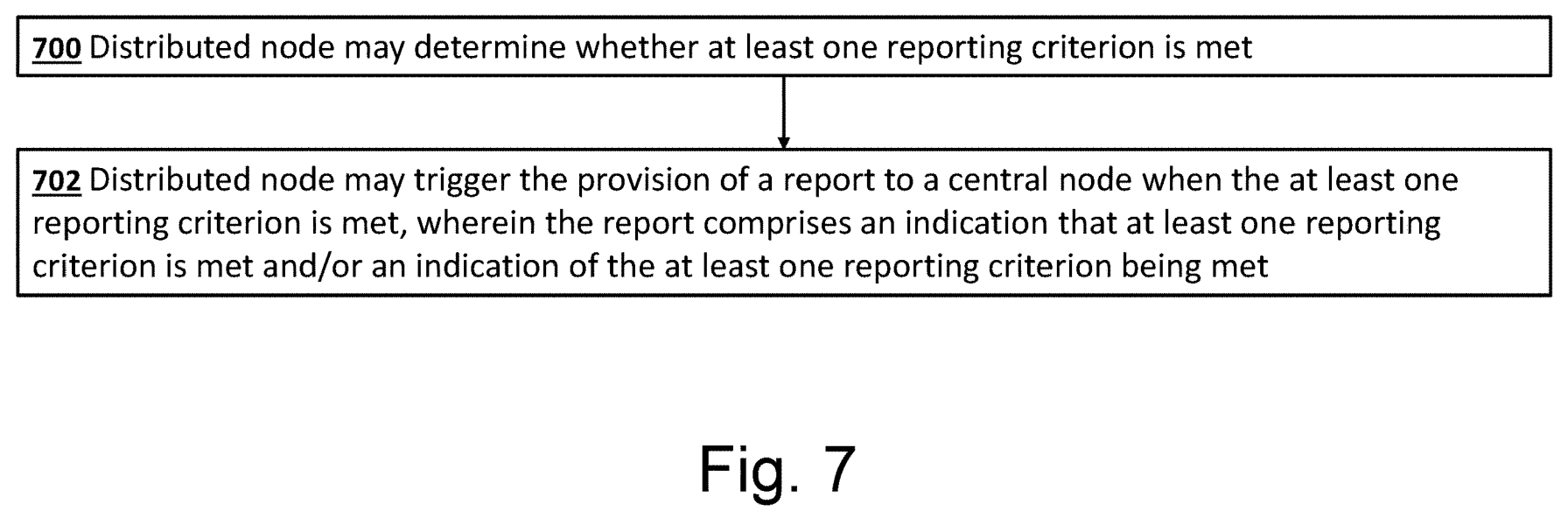

700 Distributed node may determine whether at least one reporting criterion is met 702 Distributed node may trigger the provision of a report to a central node when the at least one reporting criterion is met, wherein the report comprises an indication that at least one reporting criterion is met and/or an indication of the at least one reporting criterion being met

Fig. 7

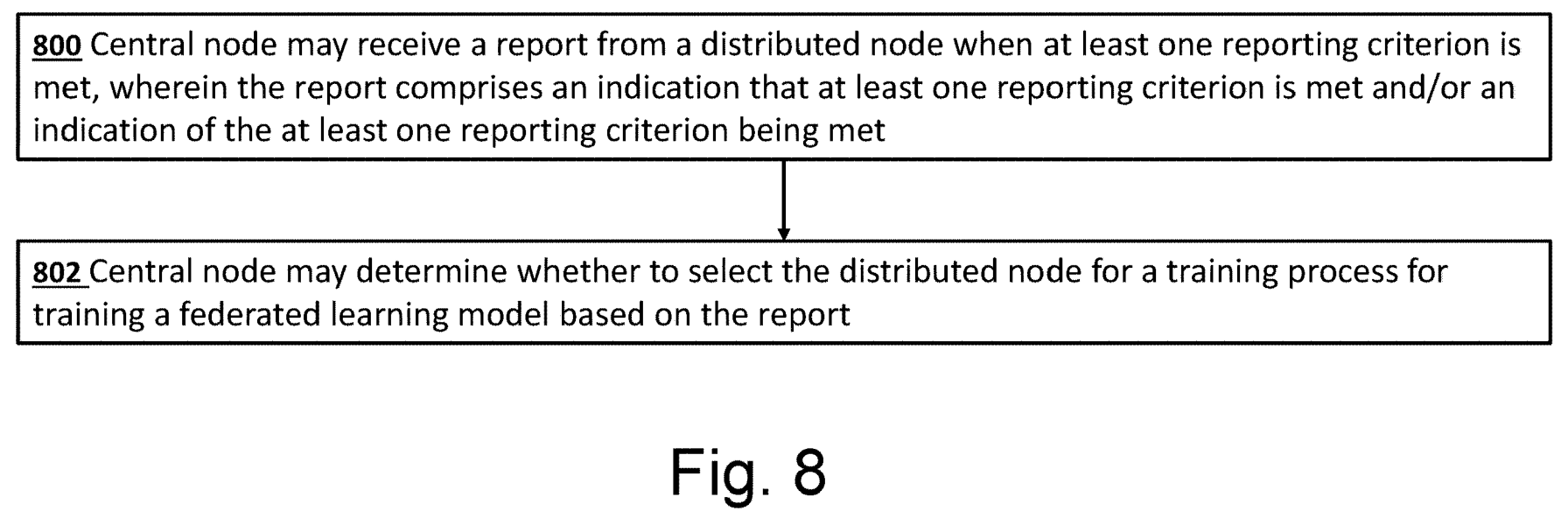

800 Central node may receive a report from a distributed node when at least one reporting criterion is met, wherein the report comprises an indication that at least one reporting criterion is met and/or an indication of the at least one reporting criterion being met 802 Central node may determine whether to select the distributed node for a training process for training a federated learning model based on the report

Fig. 8

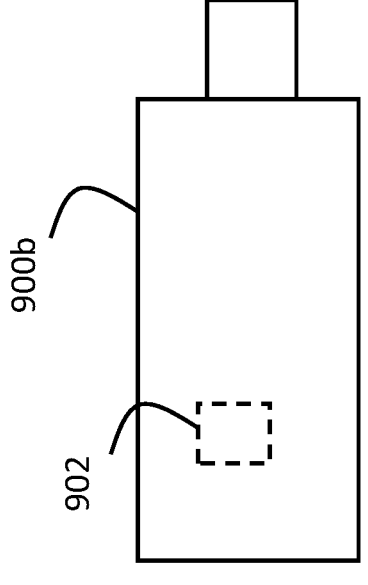
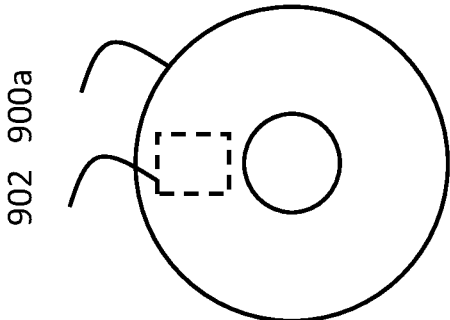
Fig. 9

APPARATUS, METHOD, AND COMPUTER PROGRAM

CROSS-REFERENCE TO RELATED APPLICATIONS

This application is a national stage application, filed under 35 U.S.C. § 371, of International Patent Application No. PCT/EP2021/068039, filed on Jun. 30, 2021, which is hereby incorporated herein by reference.

FIELD OF THE DISCLOSURE

The present disclosure relates to an apparatus, a method, and a computer program for providing a report to a central node when at least one reporting criterion is met and selecting a distributed node for a training process for training a federated learning model based on the report.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising means for: determining whether at least one reporting criterion is met; and triggering the provision of a report to a central node when the at least one reporting criterion is met, wherein the report comprises an indication that at least one reporting criterion is met and/or an indication of the at least one reporting criterion being met.

The apparatus may comprise means for: abstaining from triggering the provision of the report to the central node when the at least one reporting criterion is not met.

The apparatus may comprise means for: triggering the provision of the report to the central node when the at least one reporting criterion is not met, wherein the report comprises an indication that at least one reporting criterion is not met and/or an indication of the at least one reporting criterion not being met.

The at least one reporting criterion may comprise at least one data collection context criterion to be compared to a data collection context at the apparatus, wherein the data collection context at the apparatus defines a context in which data is collected.

The data may be collected by the apparatus or by another apparatus (e.g. another apparatus coupled to the apparatus).

The at least one data collection context criterion may comprise at least one: geographical area criterion to be compared to a geographical area of the apparatus in which data is collected; channel load criterion to be compared to a channel load of a channel used by the apparatus in which data is collected; mobility criterion to be compared to a mobility of the apparatus in which data is collected; environment criterion to be compared to an environment of the apparatus in which data is collected; and/or time criterion to be compared to a time at which data is collected.

The at least one reporting criterion may comprise at least one resource criterion to be compared to an available resource of the apparatus.

The at least one resource criterion may comprise at least one computation resource criterion to be compared to a computation resource of the apparatus and/or power resource criterion to be compared to a power resource of the apparatus.

The at least one reporting criterion may comprise at least one reporting criterion received from the central node in a configuration message.

The message may be received before a first iteration of a training process for training a federated learning model, before each iteration of a training process for training a federated learning model or before every N iterations of a training process for training a federated learning model, wherein N is an integer greater than 1. N may be fixed or variable (e.g. random).

The apparatus may comprise means for: receiving a request to participate to a training process for training a federated learning model.

The apparatus may comprise means for: receiving the request to participate to the training process for training the federated learning model before each iteration of the training process or before every N iterations of the training process, wherein N is an integer greater than 1. N may be fixed or variable (e.g. random).

The at least one reporting criterion may comprise at least one reporting criterion autonomously determined by the apparatus.

The apparatus may be a user equipment and the central node may be a base station.

The apparatus may be a base station and the central node may be a core network function.

The apparatus may be an individual management domain apparatus and the central node may be an end-to-end service management domain apparatus.

According to an aspect there is provided an apparatus comprising at least one processor and at least one memory including computer code for one or more programs, the at least one memory and the computer code configured, with the at least one processor, to cause the apparatus at least to: determine whether at least one reporting criterion is met; and trigger the provision of a report to a central node when the at least one reporting criterion is met, wherein the report comprises an indication that at least one reporting criterion is met and/or an indication of the at least one reporting criterion being met.

The at least one memory and the computer code may be configured, with the at least one processor, to cause the apparatus at least to: abstain from triggering the provision of the report to the central node when the at least one reporting criterion is not met.

The at least one memory and the computer code may be configured, with the at least one processor, to cause the apparatus at least to: trigger the provision of the report to the central node when the at least one reporting criterion is not met, wherein the report comprises an indication that at least one reporting criterion is not met and/or an indication of the at least one reporting criterion not being met.

The at least one reporting criterion may comprise at least one data collection context criterion to be compared to a data collection context at the apparatus, wherein the data collection context at the apparatus defines a context in which data is collected.

The data may be collected by the apparatus or by another apparatus (e.g. another apparatus coupled to the apparatus).

The at least one data collection context criterion may comprise at least one: geographical area criterion to be compared to a geographical area of the apparatus in which data is collected; channel load criterion to be compared to a channel load of a channel used by the apparatus in which data is collected; mobility criterion to be compared to a mobility of the apparatus in which data is collected; environment criterion to be compared to an environment of the apparatus in which data is collected; and/or time criterion to be compared to a time at which data is collected.

The at least one reporting criterion may comprise at least one resource criterion to be compared to an available resource of the apparatus.

The at least one resource criterion may comprise at least one computation resource criterion to be compared to a computation resource of the apparatus and/or power resource criterion to be compared to a power resource of the apparatus.

The at least one reporting criterion may comprise at least one reporting criterion received from the central node in a configuration message.

The message may be received before a first iteration of a training process for training a federated learning model, before each iteration of a training process for training a federated learning model or before every N iterations of a training process for training a federated learning model, wherein N is an integer greater than 1. N may be fixed or variable (e.g. random).

The at least one memory and the computer code may be configured, with the at least one processor, to cause the apparatus at least to: receive a request to participate to a training process for training a federated learning model.

The at least one memory and the computer code may be configured, with the at least one processor, to cause the apparatus at least to: receive the request to participate to the training process for training the federated learning model before each iteration of the training process or before every N iterations of the training process, wherein N is an integer greater than 1. N may be fixed or variable (e.g. random).

The at least one reporting criterion may comprise at least one reporting criterion autonomously determined by the apparatus.

The apparatus may be a user equipment and the central node may be a base station.

The apparatus may be a base station and the central node may be a core network function.

The apparatus may be an individual management domain apparatus and the central node may be an end-to-end service management domain apparatus.

According to an aspect there is provided an apparatus comprising circuitry configured to: determine whether at least one reporting criterion is met; and trigger the provision of a report to a central node when the at least one reporting criterion is met, wherein the report comprises an indication that at least one reporting criterion is met and/or an indication of the at least one reporting criterion being met.

The apparatus may comprise circuitry configured to: abstain from triggering the provision of the report to the central node when the at least one reporting criterion is not met.

The apparatus may comprise circuitry configured to: trigger the provision of the report to the central node when the at least one reporting criterion is not met, wherein the report comprises an indication that at least one reporting criterion is not met and/or an indication of the at least one reporting criterion not being met.

The at least one reporting criterion may comprise at least one data collection context criterion to be compared to a data collection context at the apparatus, wherein the data collection context at the apparatus defines a context in which data is collected.

The data may be collected by the apparatus or by another apparatus (e.g. another apparatus coupled to the apparatus).

The at least one data collection context criterion may comprise at least one: geographical area criterion to be compared to a geographical area of the apparatus in which data is collected; channel load criterion to be compared to a channel load of a channel used by the apparatus in which data is collected; mobility criterion to be compared to a mobility of the apparatus in which data is collected; environment criterion to be compared to an environment of the apparatus in which data is collected; and/or time criterion to be compared to a time at which data is collected.

The at least one reporting criterion may comprise at least one resource criterion to be compared to an available resource of the apparatus.

The at least one resource criterion may comprise at least one computation resource criterion to be compared to a computation resource of the apparatus and/or power resource criterion to be compared to a power resource of the apparatus.

The at least one reporting criterion may comprise at least one reporting criterion received from the central node in a configuration message.

The message may be received before a first iteration of a training process for training a federated learning model, before each iteration of a training process for training a federated learning model or before every N iterations of a training process for training a federated learning model, wherein N is an integer greater than 1. N may be fixed or variable (e.g. random).

The apparatus may comprise circuitry configured to: receive a request to participate to a training process for training a federated learning model.

The apparatus may comprise circuitry configured to: receive the request to participate to the training process for training the federated learning model before each iteration of the training process or before every N iterations of the training process, wherein N is an integer greater than 1. N may be fixed or variable (e.g. random).

The at least one reporting criterion may comprise at least one reporting criterion autonomously determined by the apparatus.

The apparatus may be a user equipment and the central node may be a base station.

The apparatus may be a base station and the central node may be a core network function.

The apparatus may be an individual management domain apparatus and the central node may be an end-to-end service management domain apparatus.

According to an aspect there is provided a method comprising: determining whether at least one reporting criterion is met; and triggering the provision of a report to a central node when the at least one reporting criterion is met, wherein the report comprises an indication that at least one reporting criterion is met and/or an indication of the at least one reporting criterion being met.

The method may comprise: abstaining from triggering the provision of the report to the central node when the at least one reporting criterion is not met.

The method may comprise: triggering the provision of the report to the central node when the at least one reporting criterion is not met, wherein the report comprises an indication that at least one reporting criterion is not met and/or an indication of the at least one reporting criterion not being met.

The at least one reporting criterion may comprise at least one data collection context criterion to be compared to a data collection context at the apparatus, wherein the data collection context at the apparatus defines a context in which data is collected.

The data may be collected by the apparatus or by another apparatus (e.g. another apparatus coupled to the apparatus).

The at least one data collection context criterion may comprise at least one: geographical area criterion to be compared to a geographical area of the apparatus in which data is collected; channel load criterion to be compared to a channel load of a channel used by the apparatus in which data is collected; mobility criterion to be compared to a mobility of the apparatus in which data is collected; environment criterion to be compared to an environment of the apparatus in which data is collected; and/or time criterion to be compared to a time at which data is collected.

The at least one reporting criterion may comprise at least one resource criterion to be compared to an available resource of the apparatus.

The at least one resource criterion may comprise at least one computation resource criterion to be compared to a computation resource of the apparatus and/or power resource criterion to be compared to a power resource of the apparatus.

The at least one reporting criterion may comprise at least one reporting criterion received from the central node in a configuration message.

The message may be received before a first iteration of a training process for training a federated learning model, before each iteration of a training process for training a federated learning model or before every N iterations of a training process for training a federated learning model, wherein N is an integer greater than 1. N may be fixed or variable (e.g. random).

The method may comprise: receiving a request to participate to a training process for training a federated learning model.

The method may comprise: receiving the request to participate to the training process for training the federated learning model before each iteration of the training process or before every N iterations of the training process, wherein N is an integer greater than 1. N may be fixed or variable (e.g. random).

The at least one reporting criterion may comprise at least one reporting criterion autonomously determined by the apparatus.

The method may be performed by a user equipment and the central node may be a base station.

The method may be performed by a base station and the central node may be a core network function.

The method may be performed by an individual management domain apparatus and the central node may be an end-to-end service management domain apparatus.

According to an aspect there is provided a computer program comprising computer executable code which when run on at least one processor is configured to: determine whether at least one reporting criterion is met; and trigger the provision of a report to a central node when the at least one reporting criterion is met, wherein the report comprises an indication that at least one reporting criterion is met and/or an indication of the at least one reporting criterion being met.

The computer program may comprise computer executable code which when run on at least one processor is configured to: abstain from triggering the provision of the report to the central node when the at least one reporting criterion is not met.

The computer program may comprise computer executable code which when run on at least one processor is configured to: trigger the provision of the report to the central node when the at least one reporting criterion is not met, wherein the report comprises an indication that at least one reporting criterion is not met and/or an indication of the at least one reporting criterion not being met.

The at least one reporting criterion may comprise at least one data collection context criterion to be compared to a data collection context at the apparatus, wherein the data collection context at the apparatus defines a context in which data is collected.

The data may be collected by the apparatus or by another apparatus (e.g. another apparatus coupled to the apparatus).

The at least one data collection context criterion may comprise at least one: geographical area criterion to be compared to a geographical area of the apparatus in which data is collected; channel load criterion to be compared to a channel load of a channel used by the apparatus in which data is collected; mobility criterion to be compared to a mobility of the apparatus in which data is collected; environment criterion to be compared to an environment of the apparatus in which data is collected; and/or time criterion to be compared to a time at which data is collected.

The at least one reporting criterion may comprise at least one resource criterion to be compared to an available resource of the apparatus.

The at least one resource criterion may comprise at least one computation resource criterion to be compared to a computation resource of the apparatus and/or power resource criterion to be compared to a power resource of the apparatus.

The at least one reporting criterion may comprise at least one reporting criterion received from the central node in a configuration message.

The message may be received before a first iteration of a training process for training a federated learning model, before each iteration of a training process for training a federated learning model or before every N iterations of a training process for training a federated learning model, wherein N is an integer greater than 1. N may be fixed or variable (e.g. random).

The computer program may comprise computer executable code which when run on at least one processor is configured to: receive a request to participate to a training process for training a federated learning model.

The computer program may comprise computer executable code which when run on at least one processor is configured to: receive the request to participate to the training process for training the federated learning model before each iteration of the training process or before every N iterations of the training process, wherein N is an integer greater than 1. N may be fixed or variable (e.g. random).

The at least one reporting criterion may comprise at least one reporting criterion autonomously determined by the apparatus.

The at least one processor may be part of a user equipment and the central node may be a base station.

The at least one processor may be part of a base station and the central node may be a core network function.

The at least one processor may be part of an individual management domain apparatus and the central node may be an end-to-end service management domain apparatus.

According to an aspect there is provided an apparatus comprising means for: receiving a report from a distributed node when at least one reporting criterion is met, wherein the report comprises an indication that at least one reporting criterion is met and/or an indication of the at least one reporting criterion being met; and determining whether to select the distributed node for a training process for training a federated learning model based on the report.

The apparatus may comprise means for: receiving the report to from the distributed node when the at least one reporting criterion is not met, wherein the report comprises an indication that at least one reporting criterion is not met and/or an indication of the at least one reporting criterion not being met; and determine whether to select the distributed node for a training process for training a federated learning model based on the report.

The at least one reporting criterion may comprise at least one data collection context criterion, to be compared to a data collection context at the distributed node, wherein the data collection context at the distributed node defines a context in which data is collected.

The at least one data collection context criterion may comprises at least one: geographical area criterion to be compared to a geographical area of the distributed node when data is collected; channel load criterion be compared to a channel load of a channel used by the distributed node in which data is collected; mobility criterion to be compared to a mobility of the distributed node in which data is collected; environment criterion to be compared to an environment of the distributed node in which data is collected; and/or time criterion to be compared to a time at which data is collected.

The at least one reporting criterion may comprise at least one resource criterion to be compared to an available resource of the distributed node.

The at least one resource criterion may comprise at least one computation resource criterion to be compared to a computation resource of the distributed node and/or power resource criterion to be compared to a power resource of the distributed node.

The at least one reporting criterion may comprise at least one criterion sent to the distributed node in a configuration message.

The message may be sent before a first iteration of the training process for training the federated learning model, before each iteration of the training process for training the federated learning model or before every N iterations of the training process for training the federated learning model, wherein N is an integer greater than 1. N may be fixed or variable (e.g. random).

The apparatus may comprise means for: sending a request to participate to the training process for training the federated learning model.

The apparatus may comprise means for: sending the request to participate to the training process for training the federated learning model before each iteration of the training process or before every N iterations of the training process, wherein N is an integer greater than 1. N may be fixed or variable (e.g. random).

The at least one reporting criterion may comprise at least one criterion autonomously determined by the distributed node.

The apparatus may be a base station and the distributed node may be a user equipment.

The apparatus may be a core network function and the distributed node may be a base station.

The apparatus may be an end-to-end service management domain apparatus and the distributed node may be an individual management domain apparatus.

According to an aspect there is provided an apparatus comprising at least one processor and at least one memory including computer code for one or more programs, the at least one memory and the computer code configured, with the at least one processor, to cause the apparatus at least to: receive a report from a distributed node when at least one reporting criterion is met, wherein the report comprises an indication that at least one reporting criterion is met and/or an indication of the at least one reporting criterion being met; and determine whether to select the distributed node for a training process for training a federated learning model based on the report.

The at least one memory and the computer code may be configured, with the at least one processor, to cause the apparatus at least to: receive the report to from the distributed node when the at least one reporting criterion is not met, wherein the report comprises an indication that at least one reporting criterion is not met and/or an indication of the at least one reporting criterion not being met; and determine whether to select the distributed node for a training process for training a federated learning model based on the report.

The at least one reporting criterion may comprise at least one data collection context criterion, to be compared to a data collection context at the distributed node, wherein the data collection context at the distributed node defines a context in which data is collected.

The at least one data collection context criterion may comprises at least one: geographical area criterion to be compared to a geographical area of the distributed node when data is collected; channel load criterion be compared to a channel load of a channel used by the distributed node in which data is collected; mobility criterion to be compared to a mobility of the distributed node in which data is collected; environment criterion to be compared to an environment of the distributed node in which data is collected; and/or time criterion to be compared to a time at which data is collected.

The at least one reporting criterion may comprise at least one resource criterion to be compared to an available resource of the distributed node.

The at least one resource criterion may comprise at least one computation resource criterion to be compared to a computation resource of the distributed node and/or power resource criterion to be compared to a power resource of the distributed node.

The at least one reporting criterion may comprise at least one criterion sent to the distributed node in a configuration message.

The message may be sent before a first iteration of the training process for training the federated learning model, before each iteration of the training process for training the federated learning model or before every N iterations of the training process for training the federated learning model, wherein N is an integer greater than 1. N may be fixed or variable (e.g. random).

The at least one memory and the computer code may be configured, with the at least one processor, to cause the apparatus at least to: send a request to participate to the training process for training the federated learning model.

The at least one memory and the computer code may be configured, with the at least one processor, to cause the apparatus at least to: send the request to participate to the training process for training the federated learning model before each iteration of the training process or before every N iterations of the training process, wherein N is an integer greater than 1. N may be fixed or variable (e.g. random).

The at least one reporting criterion may comprise at least one criterion autonomously determined by the distributed node.

The apparatus may be a base station and the distributed node may be a user equipment.

The apparatus may be a core network function and the distributed node may be a base station.

The apparatus may be an end-to-end service management domain apparatus and the distributed node may be an individual management domain apparatus.

According to an aspect there is provided an apparatus comprising circuitry configured to: receive a report from a distributed node when at least one reporting criterion is met, wherein the report comprises an indication that at least one reporting criterion is met and/or an indication of the at least one reporting criterion being met; and determine whether to select the distributed node for a training process for training a federated learning model based on the report.

The apparatus may comprise circuitry configured to: receive the report to from the distributed node when the at least one reporting criterion is not met, wherein the report comprises an indication that at least one reporting criterion is not met and/or an indication of the at least one reporting criterion not being met; and determine whether to select the distributed node for a training process for training a federated learning model based on the report.

The at least one reporting criterion may comprise at least one data collection context criterion, to be compared to a data collection context at the distributed node, wherein the data collection context at the distributed node defines a context in which data is collected.

The at least one data collection context criterion may comprises at least one: geographical area criterion to be compared to a geographical area of the distributed node when data is collected; channel load criterion be compared to a channel load of a channel used by the distributed node in which data is collected; mobility criterion to be compared to a mobility of the distributed node in which data is collected; environment criterion to be compared to an environment of the distributed node in which data is collected; and/or time criterion to be compared to a time at which data is collected.

The at least one reporting criterion may comprise at least one resource criterion to be compared to an available resource of the distributed node.

The at least one resource criterion may comprise at least one computation resource criterion to be compared to a computation resource of the distributed node and/or power resource criterion to be compared to a power resource of the distributed node.

The at least one reporting criterion may comprise at least one criterion sent to the distributed node in a configuration message.

The message may be sent before a first iteration of the training process for training the federated learning model, before each iteration of the training process for training the federated learning model or before every N iterations of the training process for training the federated learning model, wherein N is an integer greater than 1. N may be fixed or variable (e.g. random).

The apparatus may comprise circuitry configured to: send a request to participate to the training process for training the federated learning model.

The apparatus may comprise circuitry configured to: send the request to participate to the training process for training the federated learning model before each iteration of the training process or before every N iterations of the training process, wherein N is an integer greater than 1. N may be fixed or variable (e.g. random).

The at least one reporting criterion may comprise at least one criterion autonomously determined by the distributed node.

The apparatus may be a base station and the distributed node may be a user equipment.

The apparatus may be a core network function and the distributed node may be a base station.

The apparatus may be an end-to-end service management domain apparatus and the distributed node may be an individual management domain apparatus.

According to an aspect there is provided a method comprising: receiving a report from a distributed node when at least one reporting criterion is met, wherein the report comprises an indication that at least one reporting criterion is met and/or an indication of the at least one reporting criterion being met; and determining whether to select the distributed node for a training process for training a federated learning model based on the report.

The method may comprise: receiving the report to from the distributed node when the at least one reporting criterion is not met, wherein the report comprises an indication that at least one reporting criterion is not met and/or an indication of the at least one reporting criterion not being met; and determine whether to select the distributed node for a training process for training a federated learning model based on the report.

The at least one reporting criterion may comprise at least one data collection context criterion, to be compared to a data collection context at the distributed node, wherein the data collection context at the distributed node defines a context in which data is collected.

The at least one data collection context criterion may comprises at least one: geographical area criterion to be compared to a geographical area of the distributed node when data is collected; channel load criterion be compared to a channel load of a channel used by the distributed node in which data is collected; mobility criterion to be compared to a mobility of the distributed node in which data is collected; environment criterion to be compared to an environment of the distributed node in which data is collected; and/or time criterion to be compared to a time at which data is collected.

The at least one reporting criterion may comprise at least one resource criterion to be compared to an available resource of the distributed node.

The at least one resource criterion may comprise at least one computation resource criterion to be compared to a computation resource of the distributed node and/or power resource criterion to be compared to a power resource of the distributed node.

The at least one reporting criterion may comprise at least one criterion sent to the distributed node in a configuration message.

The message may be sent before a first iteration of the training process for training the federated learning model, before each iteration of the training process for training the federated learning model or before every N iterations of the training process for training the federated learning model, wherein N is an integer greater than 1. N may be fixed or variable (e.g. random).

The method may comprise: sending a request to participate to the training process for training the federated learning model.

The method may comprise: sending the request to participate to the training process for training the federated learning model before each iteration of the training process or before every N iterations of the training process, wherein N is an integer greater than 1. N may be fixed or variable (e.g. random).

The at least one reporting criterion may comprise at least one criterion autonomously determined by the distributed node.

The method may be performed by a base station and the distributed node may be a user equipment.

The method may be performed by a core network function and the distributed node may be a base station.

The method may be performed by an end-to-end service management domain apparatus and the distributed node may be an individual management domain apparatus.

According to an aspect there is provided a computer program comprising computer executable code which when run on at least one processor is configured to: receive a report from a distributed node when at least one reporting criterion is met, wherein the report comprises an indication that at least one reporting criterion is met and/or an indication of the at least one reporting criterion being met; and determine whether to select the distributed node for a training process for training a federated learning model based on the report.

The computer program may comprise computer executable code which when run on at least one processor is configured to: receive the report to from the distributed node when the at least one reporting criterion is not met, wherein the report comprises an indication that at least one reporting criterion is not met and/or an indication of the at least one reporting criterion not being met; and determine whether to select the distributed node for a training process for training a federated learning model based on the report.

The at least one reporting criterion may comprise at least one data collection context criterion, to be compared to a data collection context at the distributed node, wherein the data collection context at the distributed node defines a context in which data is collected.

The at least one data collection context criterion may comprises at least one: geographical area criterion to be compared to a geographical area of the distributed node when data is collected; channel load criterion be compared to a channel load of a channel used by the distributed node in which data is collected; mobility criterion to be compared to a mobility of the distributed node in which data is collected; environment criterion to be compared to an environment of the distributed node in which data is collected; and/or time criterion to be compared to a time at which data is collected.

The at least one reporting criterion may comprise at least one resource criterion to be compared to an available resource of the distributed node.

The at least one resource criterion may comprise at least one computation resource criterion to be compared to a computation resource of the distributed node and/or power resource criterion to be compared to a power resource of the distributed node.

The at least one reporting criterion may comprise at least one criterion sent to the distributed node in a configuration message.

The message may be sent before a first iteration of the training process for training the federated learning model, before each iteration of the training process for training the federated learning model or before every N iterations of the training process for training the federated learning model, wherein N is an integer greater than 1. N may be fixed or variable (e.g. random).

The computer program may comprise computer executable code which when run on at least one processor is configured to: send a request to participate to the training process for training the federated learning model.

The computer program may comprise computer executable code which when run on at least one processor is configured to: send the request to participate to the training process for training the federated learning model before each iteration of the training process or before every N iterations of the training process, wherein N is an integer greater than 1. N may be fixed or variable (e.g. random).

The at least one reporting criterion may comprise at least one criterion autonomously determined by the distributed node.

The at least one processor may be part of a base station and the distributed node may be a user equipment.

The at least one processor may be part of a core network function and the distributed node may be a base station.

The at least one processor may be part of an end-to-end service management domain apparatus and the distributed node may be an individual management domain apparatus.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

List of Abbreviations

AF Application Function
AI: Artificial Intelligence
AMF: Access and Mobility Management Function
BS: Base Station
CBR: Channel Busy Ratio
CSI: Channel State Information
CU: Centralized Unit
CPU: Computing Processing Unit D2D: Device to Device
DL: Downlink
DNN: Deep Neural Network
DU: Distributed Unit
ETSI: European Telecommunications Standard Institute
gNB: gNodeB
GPU: Graphic Processing Unit
GSM: Global System for Mobile communication
HARQ: Hybrid automated Repeat Request
HSS: Home Subscriber Server
IoT: Internet of Things
LTE: Long Term Evolution
MAC: Medium Access Control
MCS: Modulation and Coding Scheme
ML: Machine Learning
MS: Mobile Station
MTC: Machine Type Communication
NEF: Network Exposure Function
NF: Network Function
Non-IID: non-Independent Identical Distribution
NR: New radio
NRF: Network function Repository Function
OAM: Operation Administration and Maintenance
PDU: Packet Data Unit
pQOS: predictive Quality of Service
RAM: Random Access Memory
(R)AN: (Radio) Access Network
ROM: Read Only Memory
RSRP: Received Signal Received Power
RSSI: Received Signal Strength Indicator
SI: Study Item
SMF: Session Management Function
TR: Technical Report
TS: Technical Specification
UE: User Equipment
UL: Uplink
UMTS: Universal Mobile Telecommunication System
V2X: Vehicle to Everything
WI: Work Item
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which:

FIG. 7 shows a block diagram of a method for providing a report to a central node when at least one reporting criterion is met performed for example by a distributed node;

FIG. 8 shows a block diagram of a method for selecting a distributed node for a training process for training a federated learning model based on a report performed for example by a central node; and FIG. 9 shows a schematic representation of a non-volatile memory medium storing instructions which when executed by a processor allow a processor to perform one or more of the steps of the methods of FIGS. 7 and 8.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
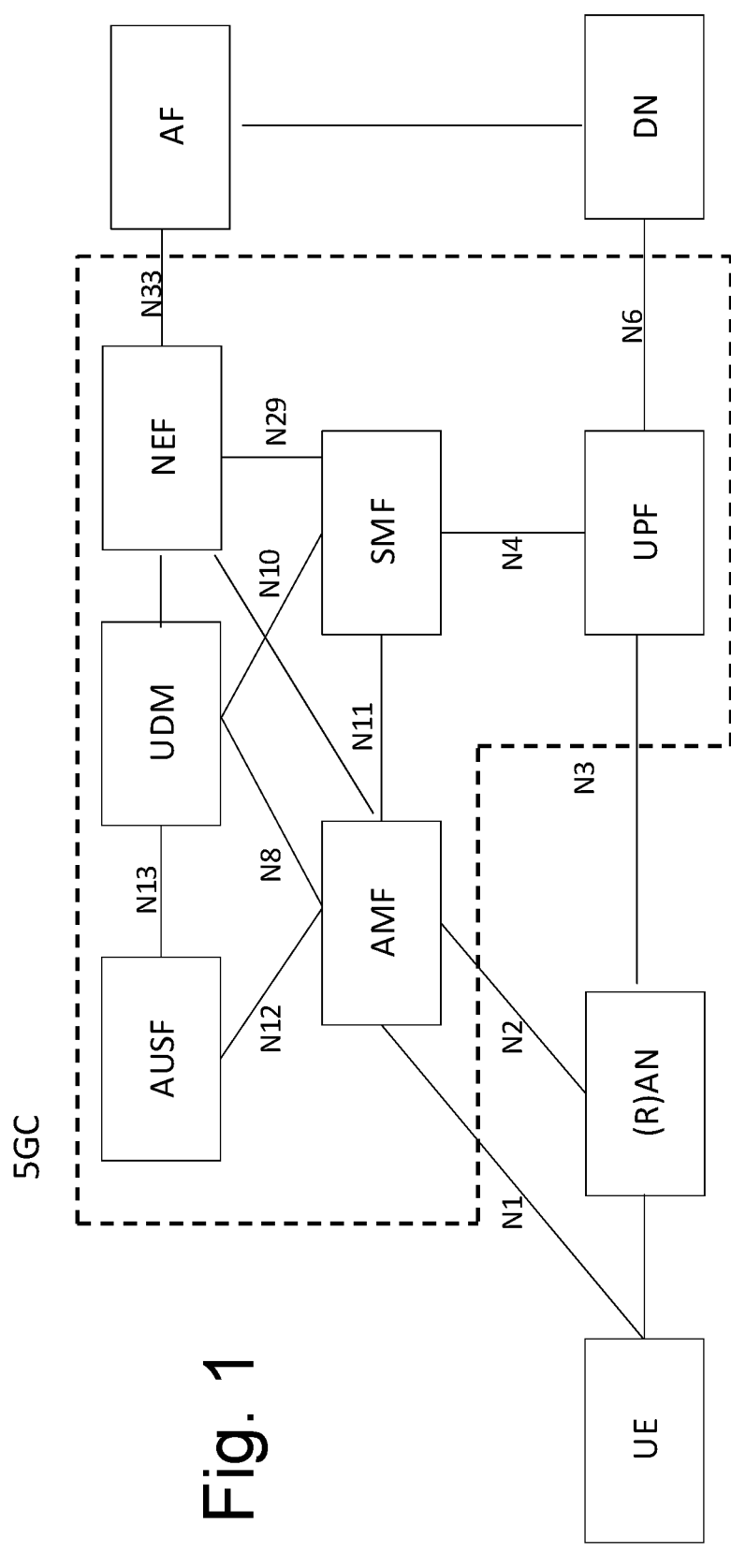
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit (DU) functions connected to one or more gNodeB (gNB) centralized unit (CU) functions.

The 5GC may comprise an access and mobility management function (AMF), a session management function (SMF), an authentication server function (AUSF), a user data management (UDM), a user plane function (UPF), a network exposure function (NEF) and/or other network functions (NFs) not represented such as an operation administration and maintenance (OAM) NF.

Figure 2:
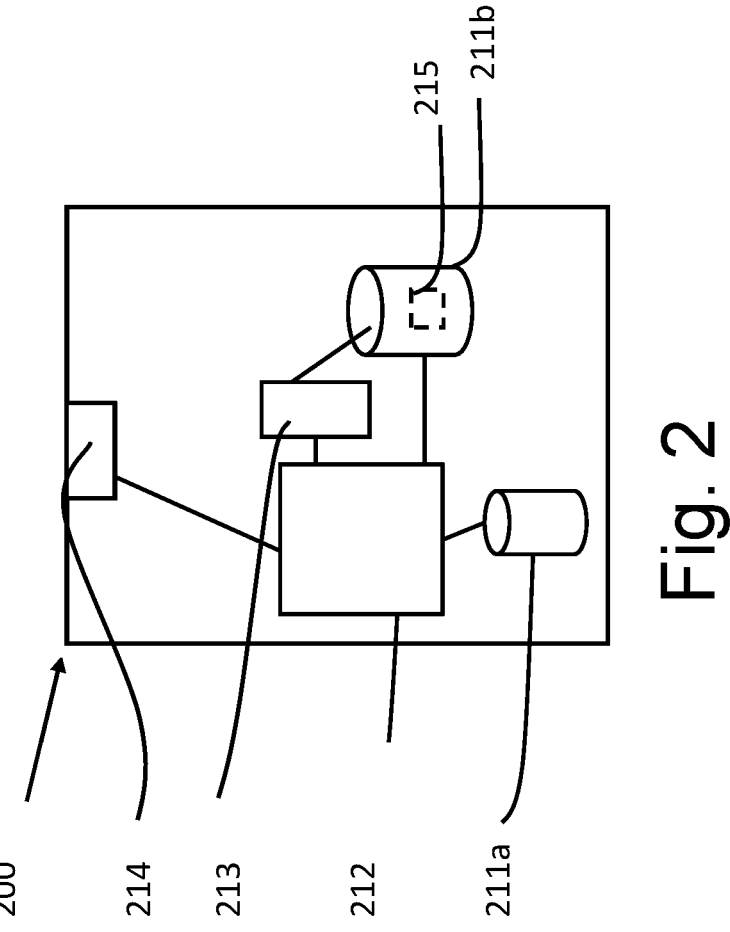
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
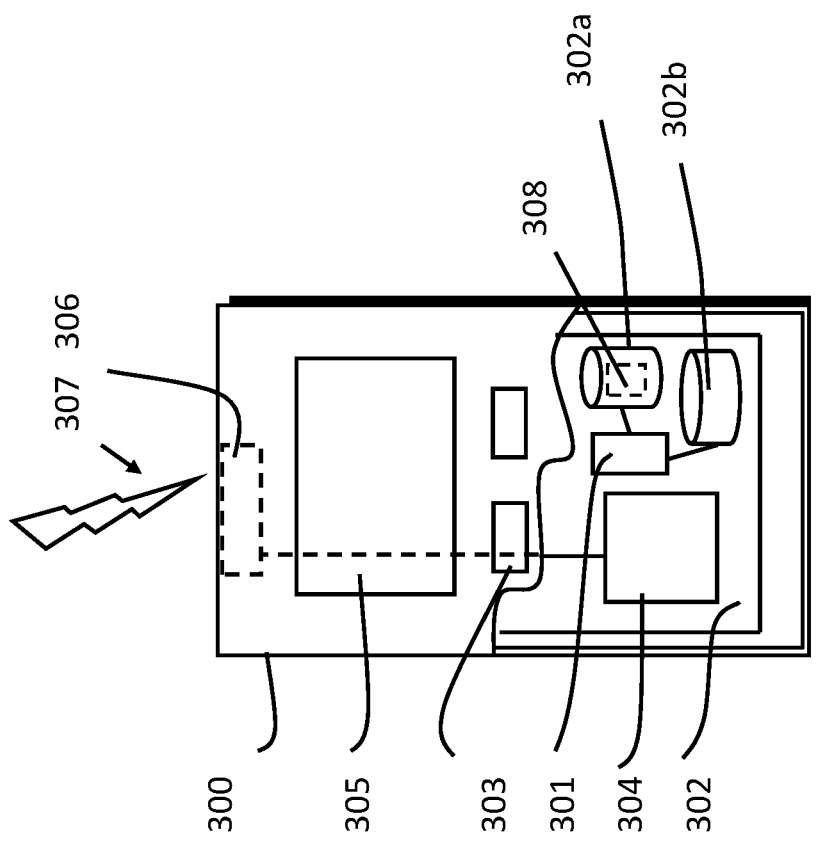
FIG. 3 shows a schematic representation of a terminal.
Figure 4:
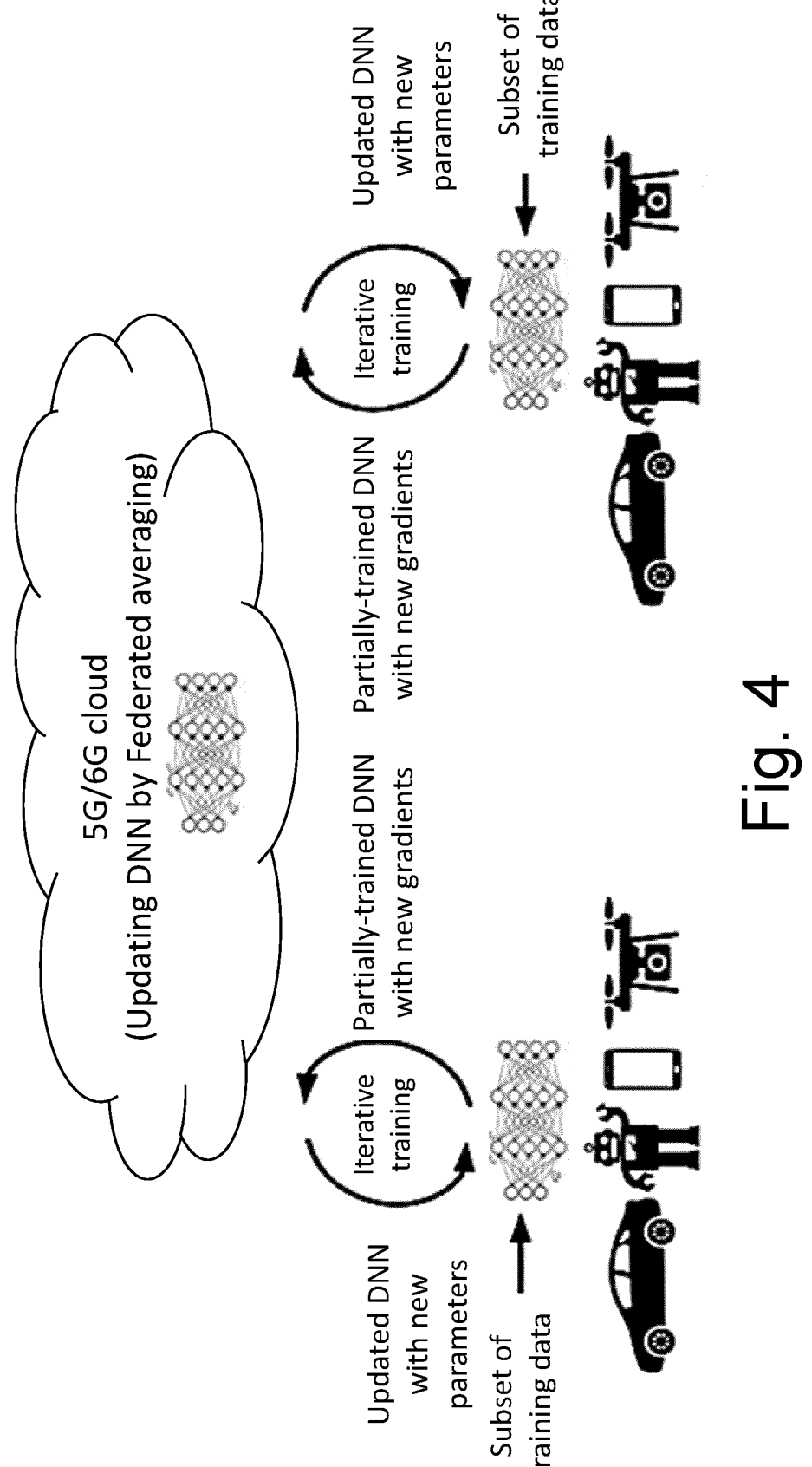
FIG. 4 shows a schematic representation of a 5GS system training a federated learning model as per 3GPP TR 22.874.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3, transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Typical ML approaches require centralizing of all the data that are collected by distributed nodes (e.g. user equipment (UEs)) on one single central node (e.g. base station or cloud server) for training. To minimize the data exchange between the distributed nodes and the central node where the model training is usually done, FL is introduced.

In FL, instead of training a model at the central node, different versions of the model may be trained at different distributed nodes (i.e. considering each distributed node has its own local data) in an iterative manner. During each iteration, the central node may aggregate local models that are partially trained at the distributed nodes. Then a consolidated single global model is sent back to the distributed nodes. This process is repeated until the global model eventually converges. The iterative FL process can be summarized with the following four steps:

Step 1: Local training—The central node may select (either randomly or based on distributed node selection schemes) and may ask K distributed nodes to download a trainable model from the central node. All K distributed nodes may locally train the model (i.e. compute training gradients or model parameters) and send the locally trained training gradients or model parameters to the central node.

Step 2: Model aggregating—The central node performs aggregation of the training gradients or model parameters from the K distributed nodes.

Step 3: Training gradients or parameters broadcasting—The central node broadcasts the aggregated training gradients or model parameters to the K distributed nodes.

Step 4: Model updating-All K distributed nodes update their respective local models with the received training gradients or aggregated parameters and examine the performance of the updated models.

After several local training and update exchanges between the central node and the K distributed nodes, it may be possible to achieve a global optimal learning model.

In a scenario, as depicted in 4, during each FL training iteration, the distributed nodes (e.g. smart car) may perform the training based on the model downloaded from the central node (i.e. 5G/6G cloud) using local training data. Then, the distributed nodes may report interim training results (e.g. training gradients for a deep neural network (DNN)) to the central node via 5G uplink (UL) channels. The central node may aggregate the training gradients from the distributed nodes and may update the global model. Next, the updated global model may be sent back to the distributed nodes via 5G downlink (DL) channels. The distributed nodes may then begin the training for the next iteration.

Figure 5:
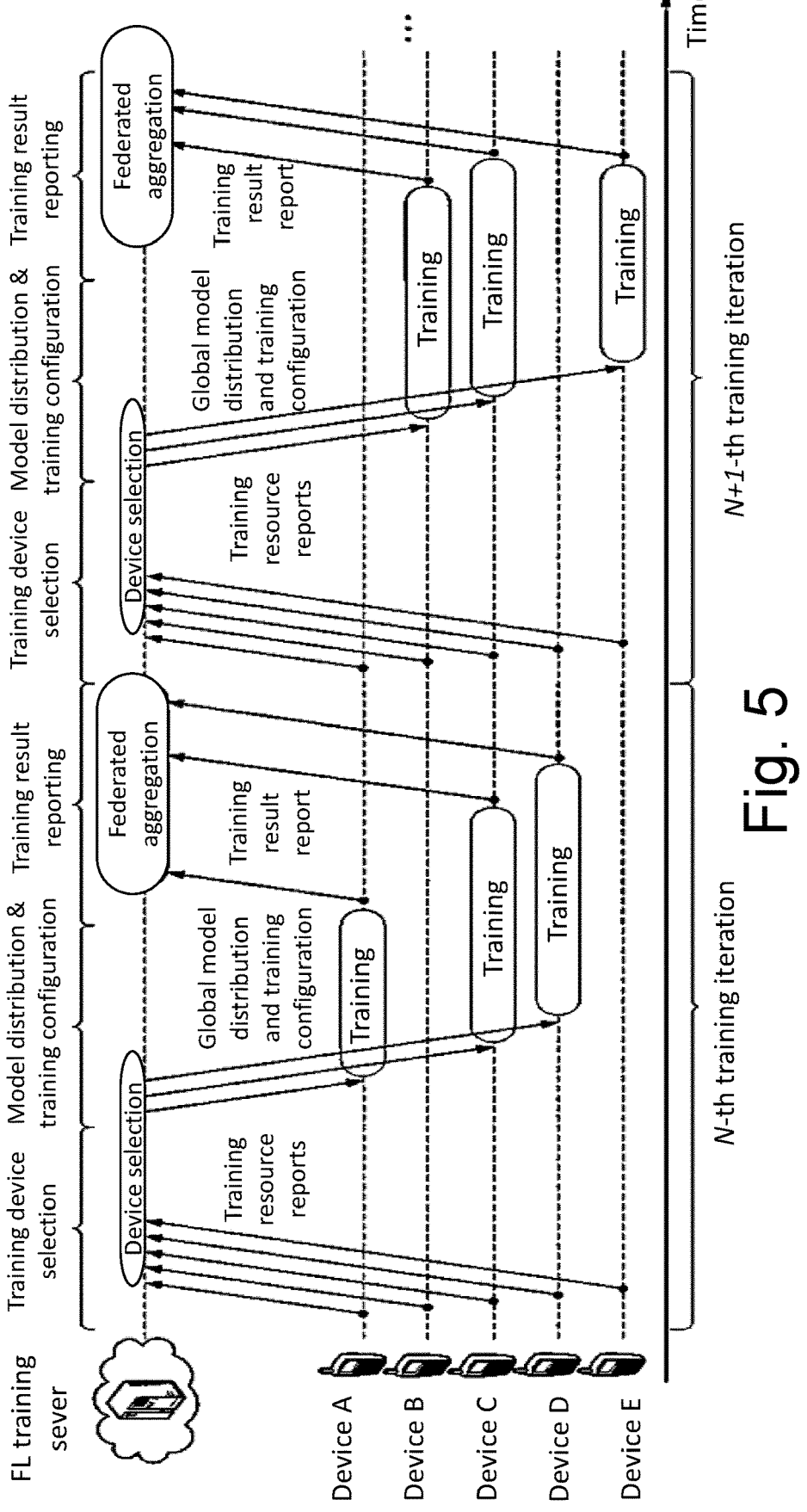
FIG. 5 shows Federated Learning protocol over wireless communication systems as per 3GPP TR 22.874.

For each iteration, the central node may select the distributed nodes that can participate in the training process. This selection may either be random or based on various distributed training node selection schemes. In 3GPP TR 22.874 Section 7.1.1 (as seen in FIG. 5), in each iteration candidate distributed nodes report their computation resource availability to the central node. Based on the reports from the devices and other conditions (e.g. the devices' wireless channel conditions), the central node may select the distributed nodes for FL training, as opposed to the random selection of distributed nodes. Then, the central node may send training configurations to the selected distributed nodes.

FL can be particularly beneficial for cases where training data is collected at devices. Since, with FL, the device can perform local training of the model and send only the interim training results (training gradients or model parameters), the data collected at the devices does not need to be sent to the central node (e.g. cloud server) for model training. This reduces the signaling overhead over Uu significantly. In addition, this may also help to protect privacy of the data as only the interim training results are sent to the central node.

For example, in case of ML-enabled sidelink (SL) predictive-quality of service (pQoS) for device-to-device (D2D) communications, the ML model may require geographical location (or zone) of the devices, SL measurements (e.g. SL received signal strength indicator (SL RSSI), SL reference signal received power (SL RSRP), SL channel state information (SL CSI), SL channel busy ratio (SL CBR), SL transmission parameters (e.g. modulation and coding scheme (MCS), SL transmission power, number of retransmissions, priority, etc.), and/or SL hybrid automatic repeat request (SL HARQ) feedback as the training data to train the ML model. These measurements are typically only available at the devices and may not be sent to the network. Any attempt to transmit these measurements to the network for ML may cause significant signaling overhead over Uu which may not be desirable. Therefore, FL can be really beneficial in such scenarios. FL may eliminate the need to send these measurements to the central node.

A key challenge in FL is the uneven distribution of data on distributed nodes. The distributed nodes (or group of distributed nodes) may have different data due to, e.g., different data collection contexts. This may result in different data distributions (non-independent identical distribution (non-IID) of data) in each distributed node (or group of distributed nodes). Consequently, the distributed nodes participating in the FL training process may not reflect the global data distribution which may lead to imbalanced training dataset (or biased training datasets). This may cause significant deterioration of the performance of FL, which may use federated averaging (i.e. the aggregation/averaging of the uploaded training gradients or model parameters at the central node), in terms of prediction accuracy and the number of iterations required for global model convergence.

For example, in the case of SL measurements in D2D communication (or SL vehicle to everything (V2X)), UEs may experience (or collect) different measurements at different geographical locations (or zones) depending on the environment (highway, urban case, presence of buildings or foliage, etc.) and/or at different channel load conditions (high/low SL CBR regime) that may affect the SL interference situation. Hence, UEs at the different geographical locations (or zones) and/or experiencing different channel load may have different data (i.e. SL measurements).

In the FL training process, if the selected training UEs have data mostly for example for highway or low channel load, the training dataset may be skewed towards the highway or low channel load conditions. Hence, any trained model may be biased and may perform poorly for urban or high channel load scenarios.

Furthermore, the distributed nodes participating in the FL training process may or may not have adequate resources (e.g. power, computation) to perform the local training. Hence, the training node selection at the central node (e.g. FL server) may, along with the bias issue, take into account the resource availability at distributed nodes. However, regular reporting of resource availability from distributed nodes to the central node results in signalling overhead which may not be desirable.

One or more aspects of this disclosure aim at providing means for improving the FL model performance by addressing the bias issue.

One or more aspects of this disclosure enable the central node to select distributed nodes during (re-)training with reduced signalling overhead. The distributed nodes may cover a broader dataset and may have adequate resources for the (re-) training.

Currently, in the FL training process, the central node (e.g. FL server) may select the distributed training nodes either randomly, based on reports (which reports information on availability of computation resources) provided by all distributed nodes and/or based on radio frequency resource (i.e. UL/DL resources) availability for UEs determined by gNBs.

In Brendan McMahan, Eider Moore, Daniel Ramage, Seth Hampson, and Blaise Aguera y Arcas "Communication-efficient learning of deep networks from decentralized data" in Artificial Intelligence and Statistics, pp. 1273-1282. PMLR, 2017 the authors introduce the 'Federated Averaging' algorithm, which proposes to combine local stochastic gradient descent on each distributed node (e.g. UE) with a central FL server (e.g. gNB) that performs model averaging. At the beginning of each iteration, a random number of distributed nodes are selected and the FL server sends the current global algorithm state to each of the randomly selected distributed nodes, which performs local training on its local dataset. Each of the selected distributed nodes is then expected to send an update to the FL server. However, they do not report any information on the available training data and/or resources. The distributed nodes are selected randomly. The bias issue is not addressed. Also, it is assumed that all distributed nodes are available to participate in the FL training process.

In Takayuki Nishio and Ryo Yonetani "Client selection for federated learning with heterogeneous resources in mobile edge" in ICC 2019-2019 IEEE International Conference on Communications (ICC), pp. 1-7. IEEE, 2019, a new distributed node selection scheme is proposed instead of the random selection scheme. At first, the central FL server (e.g. gNB) sends a request asking random distributed nodes (e.g. UEs) to provide information such as wireless channel states, computational capacities (e.g. if they can spare computing processing unit (CPU)s or graphical processing units (GPU)s for updating models) and the size of the data relevant to the current training task. Once the randomly selected distributed nodes provide the information via reports, the central FL server refers to this information in the distributed node selection step. However, in this scheme, all randomly selected distributed nodes must report the information to the central FL server, irrespective of whether they can participate in the FL training process or not. This may result in significant signalling overhead over Uu interface. Moreover, the request from the central node does not include any reporting criteria. The request does not seek information on the available training data.

In 3GPP TR 22.874, Clause 7.1 it is described that "for each iteration, the training devices can firstly be selected. The candidate training devices report their computation resource available for the training task to the FL server. The FL server makes the training device selection based on the reports from the devices and other conditions, e.g. the devices' wireless channel conditions". This scheme does not provide any reporting criteria or it does not seek information on available training data. Also, the selected candidate distributed nodes must report information on available resource (e.g. radio resource and computational resource) to the central FL server, irrespective of whether they can participate in the FL training process or not. This may result in significant signalling overhead over Uu interface.

In the above references, the distributed nodes do not report any information on the available training data. There are no means provided to enable the central node to address the bias issue. Furthermore, in the above references, the distributed nodes always report information on available resources at each FL training iteration, which may cause additional signalling overhead.

One or more aspect of this disclosure provide a scheme where a distributed node reports information on the available training data and/or information on the available resource only if adequate training data and/or resources are available for the local training. Moreover, power may also be considered as a resource.

A way to tackle the bias issue in FL is to have a subset of distributed nodes participating in the FL (re-)training process to equally represent all subsets of an overall population under observation. In this regard, the central node (e.g. FL server) must be aware of the distributed nodes having data that can reduce/mitigate the bias in FL model so that it can consider those nodes in the training node selection. In addition, the central node must be aware of the resource availability at the distributed nodes to be part of the training. Therefore, one or more aspects of this disclosure propose the following:

An FL node report configuration may be sent from the central node (e.g. FL server) to the distributed nodes providing information concerning training data (e.g. for reduction/mitigation of the bias in FL model) and/or available resources that the central node is seeking for local training at the distributed nodes.

The FL node report configuration may comprise reporting criteria. The reporting criteria may be criteria that trigger a distributed node to send a FL node report to the central node (either periodically or once) to report the availability of the training data and/or resources that the central node is seeking. The reporting criteria may comprise data collection context criteria such as a geographical area criterion, a channel load criterion, a mobility criterion, an environment criterion, a time criterion, or other criteria. The reporting criteria may comprise resource criteria such as a CPU criterion, a GPU criterion, a power criterion, or other criteria.

The FL node report configuration may comprise a reporting format. The reporting format may be the quantities that a distributed node includes in the FL node report. The quantity can comprise an indication (e.g. flag) that at least one of the criteria is met and/or an indication (e.g. index) of the at least one criterion being met at the distributed node.

Each distributed node may evaluate the reporting criteria provided in FL node report configuration with the available training data (i.e. the training data that it can collect) and available resources. That is, a distributed node may determine whether or not the available training data satisfy one or more data collection context criteria, and/or available resources satisfy the one or more resource criteria provided as the reporting criteria.

Additionally or alternatively, each distributed node may autonomously determine one or more reporting criteria based on local constraints such as power or device temperature. As an example, each distributed node may choose a power criterion as a resource criterion. Each distributed node may determine, e.g. based on local configuration or policies, a minimum power that must be available at the distributed node to trigger the FL node report. As another example, a distributed node may have a device temperature dependent reporting criterion. If the distributed node is overheating (or going to overheat), it may not wish to participate in local training and determine not to send a report so that it is not selected as a training node. In this case, a UE may introduce a device temperature dependent reporting criterion.

If one or more reporting criterion is met at the distributed node, the distributed node may send a FL node report to the central node to report the availability of the training data and/or resources that the central node is seeking (which is indicated through the reporting criteria).

The FL node report may include quantities as per the reporting format provided in FL node report configuration.

The training node selection scheme at the central node may take into account the FL node report from the responding distributed node(s) while selecting training nodes for the FL model (re)training. In this way, the model bias may be reduced.

In one implementation, the central node may be a gNB and the distributed nodes may be UEs. In another implementation, the central node may be an operation administration and maintenance (OAM) and gNBs may be the distributed nodes. It is noted that there may also be other implementation possibilities concerning the placement of the central node (e.g. in application server, end-to-end service managers) and the distributed nodes (e.g. in domain specific managers).

Figure 6:
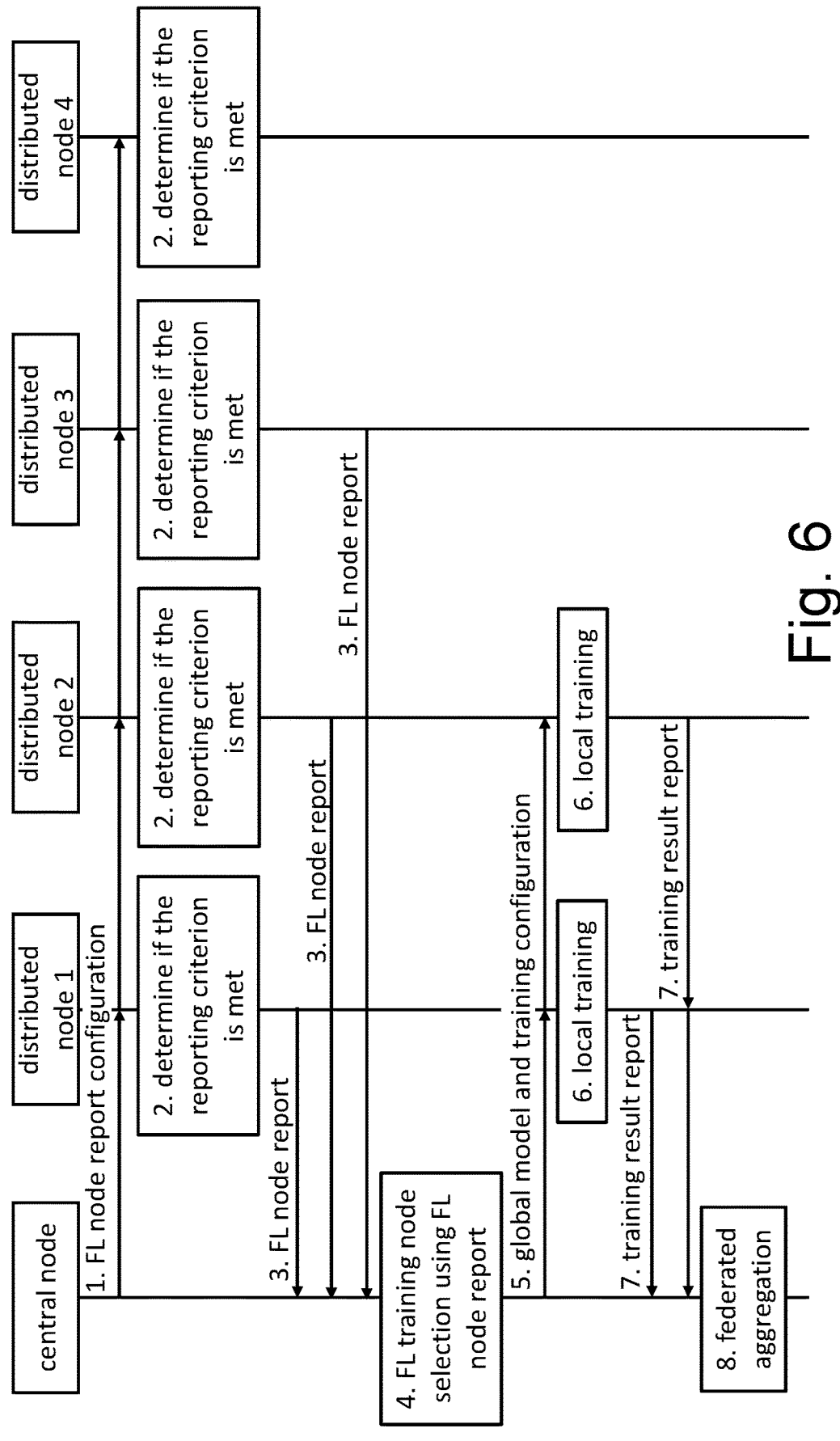
FIG. 6 shows a signalling diagram for providing a report to a central node when at least one reporting criterion is met at a distributed node and selecting a distributed node for a training process for training a federated learning model based on the report.

FIG. 6 shows a signalling diagram for providing a report to a central node when at least one reporting criterion is met at a distributed node and selecting a distributed node for a training process for training a FL model based on the report.

In step 1 the central node (e.g. FL server) may send the FL node report configuration to all the distributed nodes (e.g. distributed node 1 to distributed node 4). Here, the FL node report configuration may provide information on training data (e.g. for reduction of the bias in FL model) and/or resources (e.g. computation resource) that the central node is seeking for local training at the distributed nodes.

The FL node report configuration may comprise reporting criteria. The reporting criteria may comprise criteria that trigger the distributed node to send a FL node report to the central node (it can either be periodic or a single event-based). The reporting criteria may include data collection context criteria and/or resource criteria.

The data collection context criteria may comprise a geographical area criterion to seek training data associated (or collected) at one or more geographical areas of interest; It may contain geographical area information with one or more geographical zones similar to the zones defined in 3GPP TS 38.331 (section 5.8.11) or geographical point coordinates with radius of the interested area.

The data collection context criteria may comprise a channel load criterion to seek data associated (or collected) with one or more channel load conditions (e.g. collected at a CBR range). It may contain channel load (or CBR) range.

The data collection context criteria may comprise a mobility criterion to seek data associated (or collected) with one or more mobility conditions. It may contain mobility parameters with ranges (e.g. collected at a certain velocity range of a distributed node (e.g. if distributed node is a UE)).

The data collection context criteria may comprise an environment criterion to seek data associated (or collected) with one or more environment conditions (e.g. urban, countryside, highway). It may contain environment parameters with/without ranges (e.g. distance range from an urban, countryside, highway environment in which the data is collected).

The data collection context criteria may comprise a time condition criterion to seek data associated (or collected) with one or more time conditions. It may contain time parameters with/without ranges (e.g. time range in which the data is/was collected).

The resource criteria may comprise a CPU and/or GPU criterion. It may contain a value indicating a minimum CPU and/or GPU requirement for local training.

The resource criteria may comprise a power criterion. It may contain a value indicating a minimum power resource requirement for local training.

The FL node report configuration may comprise a reporting format. The reporting format may comprise quantities that a distributed node may include in the FL node report. The quantities may comprise an indication (e.g. flag) that at least one of the reporting criteria is met at the distributed node (i.e. indication of availability of the training data that can reduce bias in FL model and/or resources for local training) and/or indication (e.g. index) of the at least one reporting criterion been met at the distributed node (i.e. indication of the available training data that can reduce bias in FL model and/or resources for local training).

The FL node report configuration may be sent via application layer signaling, via dedicated radio resource control (RRC) signaling, via system information (e.g. in case gNB is acting as the central node and UEs are acting as distributed nodes) or via another means.

In step 2 all distributed nodes (i.e. distributed node 1 to distributed node 4) may evaluate the reporting criteria provided in FL node report configuration with the available training data and/or resources. That is, a distributed node may determine whether or not the available training data and/or resources satisfy one or more data collection context criteria and/or resource criteria provided in the reporting criteria. For example, if a geographical area criterion is provided as a reporting criterion (data collection context criterion), the distributed nodes may evaluate/determine whether or not it has collected (or can collect) data in the indicated geographical area.

Additionally or alternatively to the obtaining reporting criteria in step 1, the distributed node may autonomously determine reporting criteria to trigger the FL node report message to the central node if it has resources to support local training and/or if it has training data available that may reduce bias in the FL model. For example, when a prediction accuracy of the FL model falls below certain level at certain scenario, the distributed node may assume the FL model is biased, and the distributed node may determine to trigger a related FL node report message to the central node. In another example, the distribute node may also choose power as an additional resource criterion and may report FL node report only if there is sufficient power for local training.

In FIG. 6, distributed node 1 to distributed node 3 are considered to have met at least one of the data collection context criteria and/or resource criteria, that is at least one of the reporting criteria (provided in FL node report configuration in Step 1 and/or determined by the distributed nodes in Step 2).

In step 3, the distributed nodes (e.g. distributed node 1 to distributed node 3) may send a FL node report message to the central node as per the reporting format provided in FL node report configuration in Step 1. The FL node report may include an indication (e.g. flag) that at least one reporting criterion is met and/or an indication (e.g. index) of the at least one reporting criterion being met at the distributed node.

The FL node report may be sent via application layer signaling, via dedicated RRC signaling or via other means.

In step 4, a training distributed node selection scheme at the central node may take into account the FL node report from the responding distributed nodes (e.g. distributed node 1 to distributed node 3) while selecting training nodes for the FL model (re)training to reduce FL model bias.

In step 5, the central node may distribute a global FL model and training configuration to the training nodes that are selected (e.g. distributed node 1 and distributed node 2) by the training distributed node selection scheme.

In step 6, the distributed nodes (e.g. distributed node 1 and distributed node 2) that receive the global FL model and training configuration may perform local training of the global FL model.

In step 7, upon performing local training, the distributed nodes (distributed node 1 and distributed node 2) may report the training result (e.g. training gradients or model parameters) to the central node.

In step 8, upon receiving the training report from the distributed nodes (distributed node 1 and distributed node 2), the central node may aggregate (e.g. average) the training results provided in the training report and update the global model.

It will be understood that steps 1 to 8 may form one iteration of a training process of a FL mode. The training process may be iterative and therefore steps 1 to 8 may be repeated several times until the global model converges.

FIG. 7 shows a block diagram of a method for providing a report to a central node when at least one reporting criterion is met performed for example by a distributed node.

In step 700, a distributed node may determine whether at least one reporting criterion is met.

In step 702, the distributed node may trigger the provision of a report to a central node when the at least one reporting criterion is met, wherein the report comprises an indication that at least one reporting criterion is met and/or an indication of the at least one reporting criterion being met.

The distributed node may abstain from triggering the provision of the report to the central node when the at least one reporting criterion is not met.

The distributed node may: trigger the provision of the report to the central node when the at least one reporting criterion is not met, wherein the report comprises an indication that at least one reporting criterion is not met and/or an indication of the at least one reporting criterion not being met.

The at least one reporting criterion may comprise at least one data collection context criterion to be compared to a data collection context at the distributed node, wherein the data collection context at the distributed node defines a context in which data is collected.

The data may be collected by the distributed node or by another distributed node (e.g. another distributed node coupled to the distributed node).

The at least one data collection context criterion comprises at least one: geographical area criterion to be compared to a geographical area of the distributed node in which data is collected; channel load criterion to be compared to a channel load of a channel used by the distributed node in which data is collected; mobility criterion to be compared to a mobility of the distributed node in which data is collected; environment criterion to be compared to an environment of the distributed node in which data is collected; and/or time criterion to be compared to a time at which data is collected.

The at least one reporting criterion may comprise at least one resource criterion to be compared to an available resource of the distributed node.

The at least one resource criterion may comprise at least one computation resource criterion to be compared to a computation resource of the distributed node and/or power resource criterion to be compared to a power resource of the distributed node.

The at least one reporting criterion comprises at least one reporting criterion received from the central node in a configuration message.

The message may be received before a first iteration of a training process for training a federated learning model, before each iteration of a training process for training a federated learning model or before every N iterations of a training process for training a federated learning model, wherein N is an integer greater than 1. N may be fixed or variable (e.g. random).

The at least one memory and the computer code may be configured, with the at least one processor, to cause the distributed node at least to: receive a request to participate to a training process for training a federated learning model.

The distributed node may: receive the request to participate to the training process for training the federated learning model before each iteration of the training process or before every N iterations of the training process, wherein N is an integer greater than 1. N may be fixed or variable (e.g. random).

The at least one reporting criterion may comprise at least one reporting criterion autonomously determined by the distributed node.

The distributed node may be a user equipment and the central node may be a base station.

The distributed node may be a base station and the central node may be a core network function.

The distributed node may be an individual management domain apparatus and the central node may be an end-to-end service management domain apparatus.

FIG. 8 shows a block diagram of a method for selecting a distributed node for a training process for training a FL model based on a report performed for example by a central node.

In step 800, a central node may receive a report from a distributed node when at least one reporting criterion is met, wherein the report comprises an indication that at least one reporting criterion is met and/or an indication of the at least one reporting criterion being met.

In step 802, the central node may determine whether to select the distributed node for a training process for training a federated learning model based on the report.

The central node may receive the report to from the distributed node when the at least one reporting criterion is not met, wherein the report comprises an indication that at least one reporting criterion is not met and/or an indication of the at least one reporting criterion not being met; and determine whether to select the distributed node for a training process for training a federated learning model based on the report.

The at least one reporting criterion may comprise at least one data collection context criterion, to be compared to a data collection context at the distributed node, wherein the data collection context at the distributed node defines a context in which data is collected.

The at least one data collection context criterion may comprise at least one: geographical area criterion to be compared to a geographical area of the distributed node when data is collected; channel load criterion be compared to a channel load of a channel used by the distributed node in which data is collected; mobility criterion to be compared to a mobility of the distributed node in which data is collected; environment criterion to be compared to an environment of the distributed node in which data is collected; and/or time criterion to be compared to a time at which data is collected.

The at least one reporting criterion may comprise at least one resource criterion to be compared to an available resource of the distributed node.

The at least one resource criterion may comprise at least one computation resource criterion to be compared to a computation resource of the distributed node and/or power resource criterion to be compared to a power resource of the distributed node.

The at least one reporting criterion may comprise at least one criterion sent to the distributed node in a configuration message.

The message may be sent before a first iteration of the training process for training the federated learning model, before each iteration of the training process for training the federated learning model or before every N iterations of the training process for training the federated learning model, wherein N is an integer greater than 1. N may be fixed or variable (e.g. random).

The central node may: send a request to participate to the training process for training the federated learning model.

The central node may: send the request to participate to the training process for training the federated learning model before each iteration of the training process or before every N iterations of the training process, wherein N is an integer greater than 1. N may be fixed or variable (e.g. random).

The at least one reporting criterion may comprise at least one criterion autonomously determined by the distributed node.

The central node may be a base station and the distributed node may be a user equipment.

The central node may be a core network function and the distributed node may be a base station.

The central node may be an end-to-end service management domain apparatus and the distributed node may be an individual management domain apparatus.

FIG. 9 shows a schematic representation of non-volatile memory media 900a (e.g. computer disc (CD) or digital versatile disc (DVD)) and 900b (e.g. universal serial bus (USB) memory stick) storing instructions and/or parameters 902 which when executed by a processor allow the processor to perform one or more of the steps of the methods of FIGS. 7 and 8.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 7 and 8, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally, some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
(i) a combination of analogue and/or digital hardware circuit(s) with software/firmware and
(ii) any portions of hardware processor(s) with software (including digital signal processor(s)), software, and memory(ies) that work together to cause an appara-
tus, such as the communications device or base
station to perform the various functions previously
described; and (c) hardware circuit(s) and or processor(s), such as a
microprocessor(s) or a portion of a microprocessor(s),
that requires software (e.g., firmware) for operation, but
the software may not be present when it is not needed
for operation.

This definition of circuitry applies to all uses of this term
in this application, including in any claims. As a further
example, as used in this application, the term circuitry also
covers an implementation of merely a hardware circuit or
processor (or multiple processors) or portion of a hardware
circuit or processor and its (or their) accompanying software
and/or firmware. The term circuitry also covers, for example
integrated device.

The foregoing description has provided by way of exem-
plary and non-limiting examples a full and informative
description of some embodiments. However, various modi-
fications and adaptations may become apparent to those
skilled in the relevant arts in view of the foregoing descrip-
tion, when read in conjunction with the accompanying
drawings and the appended claims. However, all such and
similar modifications of the teachings will still fall within
the scope as defined in the appended claims.

The invention claimed is:

1. A distributed node for participating in federated learn-
ing, the distributed node comprising:
  at least one processor; and
  at least one memory storing instructions which, when
    executed by the at least one processor, cause the
    distributed node at least to perform:
    receiving, from a central node participating in the
      federated learning, a federated learning reporting
      configuration comprising data collection context cri-
      terion;
    determining whether at least some training data of
      training data that is available at the distributed node
      for training a local model of a global federated
      learning model satisfies the data collection context
      criterion, wherein the determining comprises com-
      paring the data collection context criterion to a data
      collection context of the training data that is avail-
      able at the distributed node, wherein the data col-
      lection context defines a context in which the train-
      ing data that is available was collected;
    based on determining that the at least some training
      data of the training data that is available at the
      distributed node satisfies the data collection context
      criterion, sending a federated learning node report to
      the central node, wherein the federated learning node
      report comprises an indication indicating that the at
      least some training data that is available at the
      distributed node satisfies the data collection context
      criterion;
    wherein the data collection criterion comprises geo-
      graphical area criterion specifying a geographical
      area and the data collection context comprises infor-
      mation indicating whether the training data was
      collected in the geographic area; and
    wherein the determining that the training data that is
      available at the distributed node satisfies the data
      collection context criterion comprises determining at
      least that the distributed node collected the training
      data from the geographical area.

2. The distributed node of claim 1, wherein the data
collection context criterion further comprises at least one of
the following:
  channel load criterion specifying a channel load of a
    channel and the data collection context comprises
    information indicating whether the training data that is
    available was collected from a channel having the
    channel load;
  mobility criterion specifying a mobility condition of the
    distributed node and the data collection context com-
    prises information indicating whether the training data
    that is available was collected has the mobility condi-
    tion;
  environment criterion specifying an environment of the
    distributed node and the data collection context com-
    prises information indicating whether the training data
    that is available was collected in the environment; or
  time criterion specifying a time and the data collection
    context comprises information indicating whether the
    training data that is available was collected at the time.

3. The distributed node of claim 1, wherein the federated
learning reporting configuration further comprises an avail-
able resource criterion that is to be compared to an available
resource of the distributed node, and wherein the federated
learning node report is sent when the available resource of
the distributed node satisfies the available resource criterion,
and wherein the federated learning node report comprises an
indication that the available resource of the distributed node
satisfies the available resource criterion.

4. The distributed node of claim 3, wherein the federated
learning reporting configuration further comprises a com-
putation resource criterion that is to be compared to infor-
mation indicating a computation resource of the distributed
node.

5. The apparatus distributed node of claim 1, wherein the
distributed node comprises a user equipment and the central
node comprises a base station.

6. The distributed node of claim 1, wherein the distributed
node comprises a base station and the central node com-
prises a core network function.

7. The distributed node of claim 1, wherein the distributed
node comprises an individual management domain appara-
tus and the central node comprises an end-to-end service
management domain apparatus.

8. A method performed by a distributed node participating
in federated learning, the method comprising:
  receiving, from a central node participating in the feder-
    ated learning, a federated learning reporting configu-
    ration comprising data collection context criterion; and
  determining whether at least some training data of train-
    ing data that is available at the distributed node for
    training a local model of a global federated learning
    model satisfies the data collection context criterion,
    wherein the determining comprises comparing the data
    collection context criterion to a data collection context
    of the training data that is available at the distributed
    node, wherein the data collection context defines a
    context in which the training data that is available was
    collected;
  based on determining that the at least some training data
    of the training data that is available at the distributed
    node satisfies the data collection context criterion,
    sending a federated learning node report to the central
    node, wherein the federated learning node report com-
    prises an indication indicating that the at least some training data of the training data that is available at the distributed node satisfies the data collection context criterion, wherein the data collection criterion comprises geographical area criterion specifying a geographical area and the data collection context comprises information indicating whether the training data was collected in the geographic area; and wherein the determining that the training data that is available at the distributed node satisfies the data collection context criterion comprises determining at least that the distributed node collected the training data from the geographical area.

9. The distributed node of claim 3, wherein the federated learning reporting configuration further comprises a power resource criterion that is to be compared to information indicating a power resource of the distributed node.

10. The distributed node of claim 4, wherein the federated learning reporting configuration further comprises a power resource criterion that is to be compared to information indicating a power resource of the distributed node.

11. The method of claim 8, wherein the data collection context criterion further comprises at least one of the following:

channel load criterion specifying a channel load of a channel and the data collection context comprises information indicating whether the training data that is available was collected from a channel having the channel load;

mobility criterion specifying a mobility condition of the distributed node and the data collection context comprises information indicating whether the training data that is available was collected has the mobility condition;

environment criterion specifying an environment of the distributed node and the data collection context comprises information indicating whether the training data that is available was collected in the environment; or time criterion specifying a time and the data collection context comprises information indicating whether the training data that is available was collected at the time.

12. The method of claim 8, wherein the federated learning reporting configuration further comprises an available resource criterion that is to be compared to an available resource of the distributed node, and wherein the federated learning node report is sent when the available resource of the distributed node satisfies the available resource criterion, and wherein the federated learning node report comprises an indication that the available resource of the distributed node satisfies the available resource criterion.

13. The method of claim 12, wherein the federated learning reporting configuration further comprises computation resource criterion that is to be compared to information indicating a computation resource of the distributed node.

14. The method of claim 12, wherein the federated learning reporting configuration further comprises a power resource criterion that is to be compared to information indicating a power resource of the distributed node.

15. The method of claim 13, wherein the federated learning reporting configuration further comprises a power resource criterion that is to be compared to information indicating a power resource of the distributed node.

16. The distributed node of claim 8, wherein the distributed node comprises a user equipment and the central node comprises a base station.

17. The method of claim 8, wherein the distributed node comprises a base station and the central node comprises a core network function.

18. The method of claim 8, wherein the distributed node comprises an individual management domain apparatus and the central node comprises an end-to-end service management domain apparatus.

* * * * *